AUTOMATIC FREQUENCY CONTROL AID

Filed Feb. 11, 1946

INVENTOR.
FRANK P. ZAFFARANO
BY
M. O. Hayes
ATTORNEY

United States Patent Office 2,746,031

Patented May 15, 1956

2,746,031

AUTOMATIC FREQUENCY CONTROL AID

Frank P. Zaffarano, Lakewood, Ohio, assignor, by mesne assignments, to the United States of America as represented by the Secretary of the Navy Application February 11, 1946, Serial No. 646,918

9 Claims. (Cl. 343—6.8)

This invention relates to electronic control systems and more particularly to the combination of an automatic frequency control system and an aiding circuit for intermittently pulsed transmitters.

Heretofore automatic frequency control systems for transmitters operated comparatively slowly when the transmitter was only intermittently pulsed. As an example, consider the problems experienced by a radar beacon system being intermittently pulsed by a scanning radar. A radar beacon transmitter pulses only when interrogated and its automatic frequency control system is only operative to correct the transmitter frequency when it pulses. Now should the transmitter be off its correct frequency when first interrogated, it would require a comparatively long time for the transmitter to automatically tune to its correct frequency. Consequently the interrogating radar might not receive a suitable response from the radar beacon for several minutes.

A general object of the present invention is to overcome the foregoing difficulties.

Another object of the present invention is to provide an automatic frequency control aiding system for intermittently pulsed transmitters which pulses the transmitter at a frequency substantially proportional to the frequency error of the transmitter causing it more quickly to be tuned to its correct frequency.

A further object is to provide an aiding system which is operative only when operation of the transmitter is required and when its frequency is not correct.

A still further object is to provide a novel electronic switch tube circuit energized by voltages of opposite phase.

These and other objects will be apparent from the following specification when taken with the accompanying drawing in which.

Figure 1:
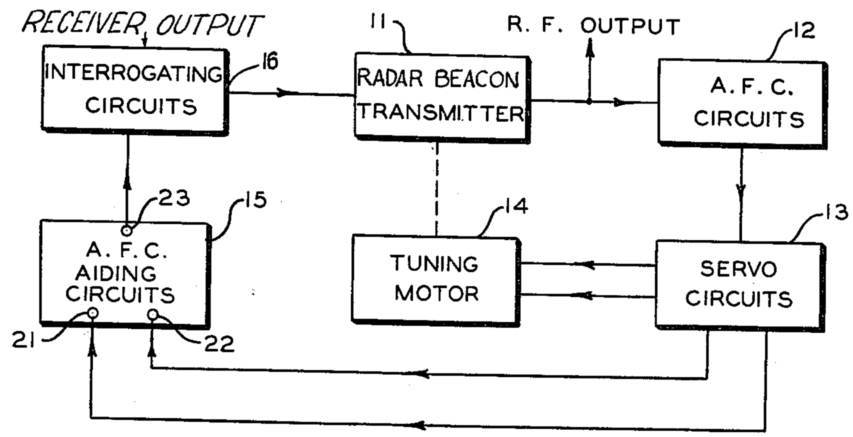
Fig. 1 is a block diagram of part of a system incorporating the invention.

Referring to the drawing, and more particularly Fig. 1, part of a radar beacon system is shown having an intermittently pulsed transmitter 11. The R. F. output of transmitter 11, besides providing the response to the interrogation of a radar, energizes A. F. C. circuits 12 which provide an output to energize servo circuits 13. The input to servo circuits 13 is a voltage substantially proportional to the frequency error of transmitter 11. Servo circuits 13 energize a tuning motor 14 which mechanically tunes transmitter 11 to the correct frequency.

An automatic frequency control system for a radar beacon transmitter 11 resides in the aforementioned elements. With only these elements the frequency of transmitter 11 is corrected in small increments only when pulsed due to an interrogation from some radar. This invention contemplates the addition of A. F. C. aiding circuits 15 to provide additional pulses for transmitter 11. Another output of servo circuits 13 is applied to input terminals 21 and 22 of aiding circuits 15. As will be shown later aiding circuits 15 produce triggers at output terminal 23 at a frequency substantially proportional to the frequency error of transmitter 11. Interrogating circuits 16 (part of the radar beacon system) are energized by the trigger output of aiding circuits 15 and cause transmitter 11 to be pulsed once for each trigger input. Interrogating circuits 16 are also energized by the output of the radar beacon receiver when interrogated by some radar. The additional pulsing of transmitter 11 due to aiding circuits 15 provides additional information to the automatic frequency control system, when it ordinarily would not receive such, so that it can more quickly correct the frequency of transmitter 11.

Figure 2:
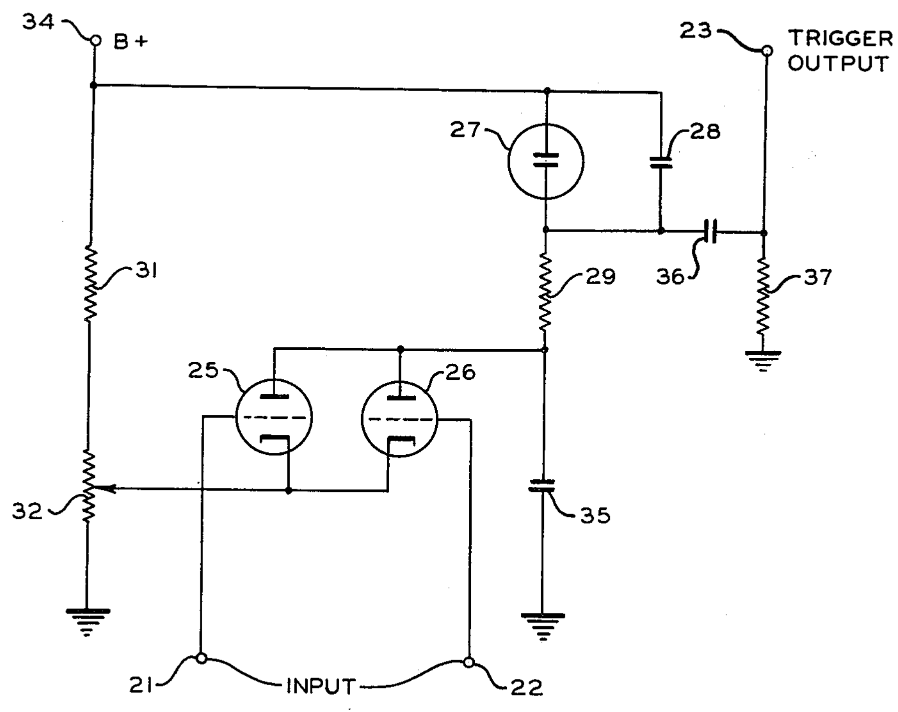
Fig. 2 is a schematic diagram of one form of the invention.

Referring to Fig. 2, a more detailed description will be given of the aiding system which cooperates with the automatic frequency control system. Input terminals 21 and 22 and trigger output terminal 23 are the same as those shown in block 15 of Fig. 1. Electron tubes 25 and 26 have their plates and cathodes connected in parallel, with their plates being connected to a positive potential, applied at terminal 34, through a large resistor 29 and the parallel combination of a glow discharge or electronic switch tube 27 and a condenser 28. The above elements comprise a relaxation oscillator wherein tubes 25 and 26 act as variable resistance elements to control its frequency. Condenser 36 and resistor 37 comprise a differentiating circuit so that a trigger output voltage appears at terminal 23 and the combination of the relaxation oscillator and the differentiating circuit comprise a variable frequency trigger generating circuit.

The grids of tubes 25 and 26 are directly connected to input terminals 21 and 22. The voltages applied to terminals 21 and 22 are variable voltages of opposite phase and such polarity as to drive tuning motor 14 in a direction which tunes transmitter 11 towards its correct frequency. These correcting voltages are an output of servo circuits 13 and are substantially proportional to the frequency error of transmitter 11. Resistor 31 and potentiometer 32 in series are connected to ground from a positive potential applied at terminal 34. The variable arm of potentiometer 32 provides the cathode bias potential of tubes 25 and 26 and is set so that tubes 25 and 26 are just at the point of non-conduction when their grids have a zero signal potential applied through input terminals 21 and 22 (i. e. when transmitter 11 is at its correct frequency). This setting of potentiometer 32 is easily ascertainable as the point of extinction of glow discharge tube 27 with no input to A. F. C. circuits 12.

Now consider the case where the radar beacon has not been interrogated for some time and transmitter 11 has drifted off frequency. The radar beacon system will maintain radar silence until it is finally interrogated by some radar. It will then pulse, energizing A. F. C. circuits 12, and producing a correcting voltage for motor 14. This correcting voltage, applied to the grids of tubes 25 and 26 (Fig. 2), causes tube 25 or 26 to conduct, depending on polarity, thereby reducing the series resistance of the relaxation oscillator. The conduction of tube 25 or 26 causes condenser 28 to charge to a potential where tube 27 becomes conducting and discharges condenser 28. This process repeats at a rate dependent on the potential at the grids of tubes 25 and 26. It is obvious that the trigger output voltage at terminal 23 will be at a frequency substantially proportional to the frequency error of transmitter 11. The trigger output at terminal 23 energizes interrogating circuits 16 which cause transmitter 11 to pulse and furnish additional information to the automatic frequency control system. Thus it is seen that the aiding circuits 15 are operative only when operation of transmitter 11 is required and provide correcting information at a rate substantially proportional to the frequency error of transmitter 11.

Condenser 35 (Fig. 2) is comparatively large and is connected in parallel with tubes 25 and 26 and allows the relaxation oscillator to oscillate for a short time after tubes 25 and 26 become non-conducting when transmitter 11 arrives at its correct frequency. This is to allow for an overshoot of tuning motor 14 so as to provide triggers which, after aforementioned circuit action, produce a correcting voltage in the opposite direction. The size of condenser 28 and resistor 29 are so chosen that the maximum frequency of the trigger output voltage at terminal 23 will be comparable to or less than the normal frequency of interrogation by a radar.

The invention described in the foregoing specification need not be limited to the details shown, which are considered to be illustrative of one form which the invention may take. Although the invention has been disclosed as being incorporated in a radar beacon system it is to be understood that it is adaptable to use with any type of automatic frequency control for an intermittently pulsed oscillator.

What is claimed is:

1. In combination with an automatic frequency control system for an intermittently pulsed transmitter, said system controlling the frequency of said transmitter only when said transmitter is pulsed, a frequency control aiding system comprising a trigger generating circuit having a variable frequency, said trigger generating circuit cooperating with said automatic frequency control system and applying energizing pulses to said transmitter when said transmitter is not at correct frequency and when transmitter operation is required.

2. The apparatus of claim 1 wherein said trigger generating circuit comprises a relaxation oscillator having the parallel combination of a switch tube and a condenser, said parallel combination being in series with a variable resistance element, the output of said relaxation oscillator being differentiated to provide triggers for said transmitter.

3. In combination with an automatic frequency control system for an intermittently pulsed transmitter, said automatic frequency control system controlling the frequency of said transmitter only when said transmitter is pulsed, a frequency control aiding system comprising a variable frequency trigger generating circuit having an electronic tube, a condenser connected in parallel with said electronic tube, and a second electronic tube having at least a grid, a cathode and a plate, acting as a variable resistance element connected in series with said first mentioned electronic tube and said condenser, said second electronic tube having its grid energized by a correcting voltage of said automatic frequency control system, said second electronic tube having a resistance substantially inversely proportional to the magnitude of said correcting voltage, said frequency control aiding system cooperating with said automatic frequency control system and applying energizing pulses to said transmitter at a frequency substantially proportional to the frequency error of said transmitter.

4. Apparatus as in claim 3 and including a third electronic tube having at least a plate, a cathode and a grid, the plates and cathodes of said second and third electronic tubes being operated in parallel, the grid of said third electronic tube being energized by said correcting voltage of said automatic frequency control system in opposite phase from the voltage energizing said grid of said second electronic tube.

5. In combination with a radar beacon system having a pulse transmitter normally responsive to pulse signals from a remote source, an automatic frequency control system responsive to the output of said transmitter for automatically tuning said transmitter to a predetermined frequency, and means responsive to the output of said control system for providing additional pulse signals to said transmitter at a repetition frequency substantially proportional to the frequency drift of said transmitter from said predetermined frequency, the repetition frequency of said additional signals being independent of the direction of said drift.

6. In combination with a radar beacon system having a transmitter adapted to be intermittently pulsed by signals from a remote radar, an automatic frequency control system operative to correct the frequency of said transmitter only when said transmitter is being pulsed, a pulse generator coupled to said control system, said generator being normally inoperative, said generator being rendered operative by the output of said frequency control system produced in response to the output of said transmitter, the pulse repetition frequency of said generator output being proportional to the frequency error of said transmitter, means for applying said generator output to said transmitter whereby said control system continues to operate in the absence of remote radar pulses, and means responsive to said control system output for tuning said transmitter.

7. In combination with a radar beacon system having a transmitter adapted to provide output signals in response to the interrogation of a remote radar, a frequency control system operative in response to said transmitter output to maintain said transmitter ouput a a predeermined frequency, a signal generator coupled to said frequency control system, said signal generator being normally inoperative when said transmitter output is at said predetermined frequency, said signal generator being rendered operative by said frequency control system when said transmitter in response to said interrogation produces an output having a frequency other than said predetermined frequency, said signal generator being adapted to produce an output having a frequency proportional to the magnitude of the difference between said predetermined frequency and said other frequency, and means responsive to said signal generator output for maintaining said transmitter operative to provide additional input to said frequency control system.

8. In combination with a transmitter adapted to be pulsed in response to the interrogation pulse of a remote radar, an automatic frequency control system comprising means adapted to provide an error voltage substantially proportional to the frequency error of said transmitter and means responsive to said output voltage for automatically tuning said transmitter to the correct frequency, a trigger generator circuit operative in response to said error voltage to produce trigger pulses at a repetition frequency proportional to the frequency error of said transmitter, and means for applying said trigger pulses to said transmitter for pulsing said transmitter whereby said automatic frequency control system continues to operate in the absence of said interrogation.

9. In combination with a radar beacon system having a transmitter adapted to produce pulses of radio-frequency energy in response to pulse signals remote from said beacon system and an automatic frequency control circuit for correcting the radio frequency of said transmitter, a pulse generator adapted to be activated by said control circuit when the radio frequency of said output pulses differs from a predetermined value, said generator being adapted to produce a series of pulses at a recurrence frequency proportional to the frequency error of said transmitter, and means for applying said pulses to said transmitter whereby said transmitter produces output pulses at a repetition rate proportional to the recurrence frequency of the pulses produced by said generator.

References Cited in the file of this patent

UNITED STATES PATENTS

| | | |
|---|---|---|
| 1,626,724 | Demarest el at. | May 3, 1927 |
| 1,921,168 | Royden | Aug. 8, 1933 |
| 2,312,374 | Unger | Mar. 2, 1943 |
| 2,376,667 | Cunningham et al. | May 22, 1945 |
| 2,401,618 | Crosby | June 4, 1946 |
| 2,411,520 | Capen | Nov. 26, 1946 |
| 2,469,875 | Fyler | May 10, 1949 |
| 2,684,478 | Fox | July 20, 1954 |